Figure 1:
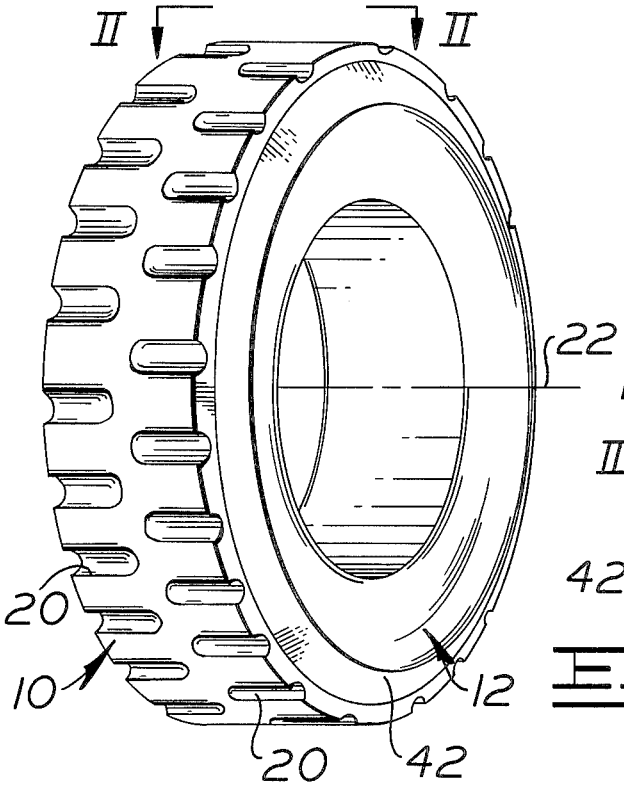
Figure 2:
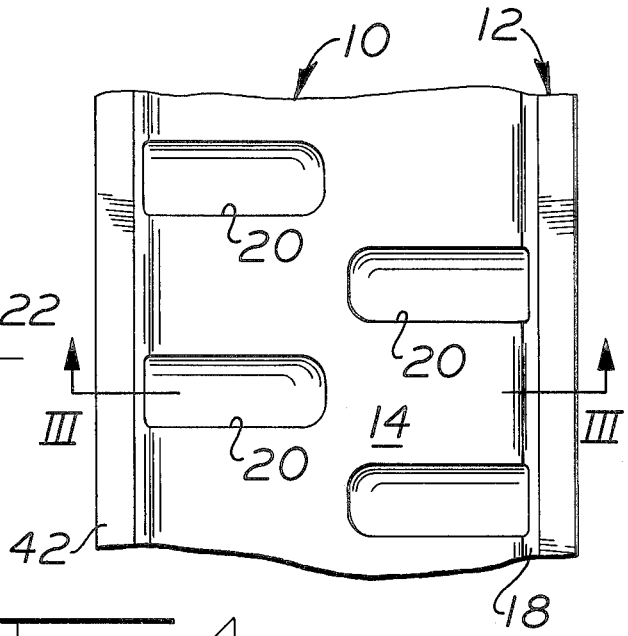
Figure 4:
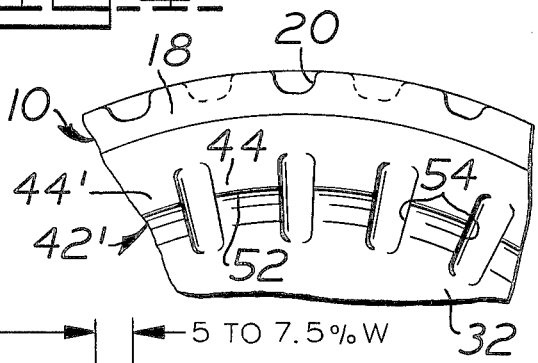
Figure 3:
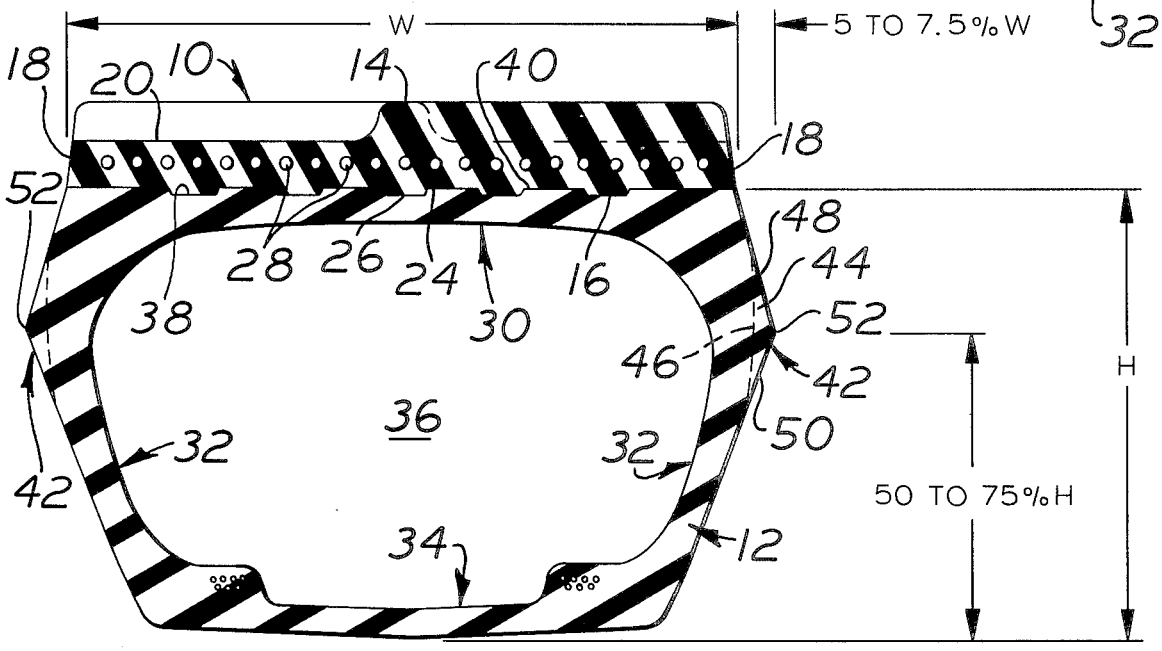

United States Defensive Publication [19] (H) [11] T973,006

Beyers [43] Aug. 1, 1978

[54] REPLACEABLE TIRE TREAD BELT AND TIRE CARCASS WITH A BUTTRESSED SIDEWALL

[75] Inventor: Marvin E. Beyers, Peoria, Ill.

[73] Assignee: Caterpillar Tractor Co., Peoria, Ill.

[21] Appl. No.: 880,821

[22] Filed: Feb. 23, 1978

[51] Int. Cl.[2] ..... B60C 11/00

[52] U.S. Cl. ..... 152/176; 152/353 R

[57] ABSTRACT

A replaceable tire tread belt has radially outer and inner peripheral surfaces and a pair of opposite side surfaces defining a preselected axial width. The tread belt is mounted on a tire carcass having a radially outer peripheral portion, a facing pair of sidewalls, and a radially inner base portion. A buttressed deflector of preselected cross sectional configuration extends axially outwardly from at least one sidewall of the tire carcass a distance axially beyond the tread belt of from 5 to 7½% of the preselected axial width for deflecting external objects away from the sidewall.

4 Claims, 1 Sheet Drawing,

7 Pages Specification

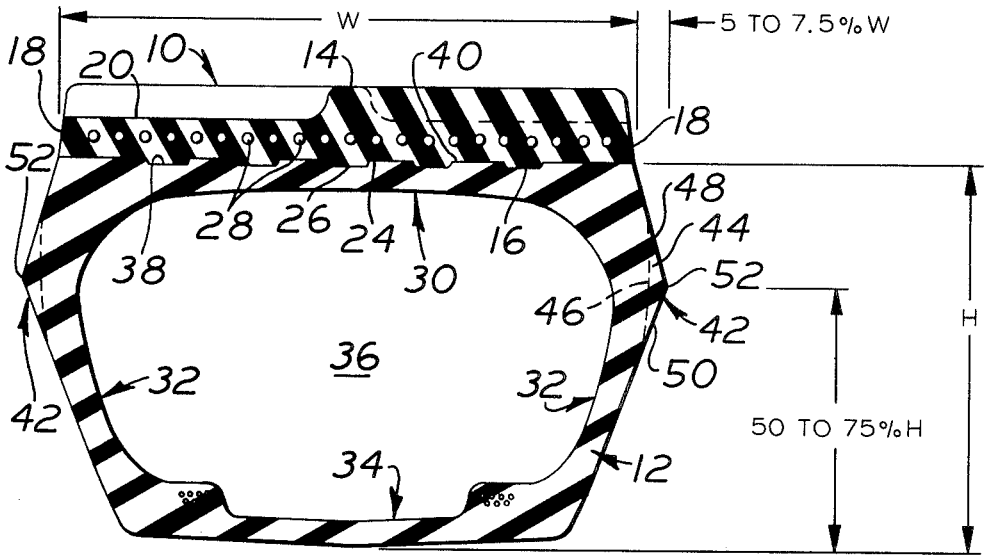

The file of this unexamined application may be inspected and copies thereof may be purchased (849 O.G. 1221, Apr. 9, 1968).